US007549821B2

(12) United States Patent
Hall et al.

(10) Patent No.: US 7,549,821 B2
(45) Date of Patent: Jun. 23, 2009

(54) WIRELESS REMOTE-CONTROLLED PAVEMENT RECYCLING MACHINE (76) Inventors: David R. Hall, 2185 S. Larsen Pkwy., Provo, UT (US) 84606; David Wahlquist, 2185 S. Larsen Pkwy., Provo, UT (US) 84606

( * ) Notice: Subject to any disclaimer, the term of this patent is extended or adjusted under 35 U.S.C. 154(b) by 281 days.

(21) Appl. No.: 11/563,553

(22) Filed: Nov. 27, 2006

(65) Prior Publication Data
US 2007/0098496 A1    May 3, 2007

Related U.S. Application Data (63) Continuation-in-part of application No. 11/379,643, filed on Apr. 21, 2006, which is a continuation-in-part of application No. 11/164,947, filed on Dec. 12, 2005, which is a continuation-in-part of application No. 11/163,615, filed on Oct. 25, 2005, which is a continuation-in-part of application No. 11/070,411, filed on Mar. 1, 2005, now Pat. No. 7,223,049.

(51) Int. Cl.
*E01C 23/09* (2006.01)
(52) U.S. Cl. .............................. 404/75; 404/72; 404/93; 404/94
(58) Field of Classification Search ............ 404/72–111
See application file for complete search history.

(56) References Cited

U.S. PATENT DOCUMENTS

| 1,887,341 | A | 11/1932 | Venable |
|---|---|---|---|
| 1,898,158 | A | 2/1933 | Winkle |
| 2,039,078 | A | 4/1936 | Hertwig |
| 2,098,895 | A | 11/1937 | Velten |
| 2,633,782 | A | 4/1953 | Clement |
| 2,893,299 | A | 7/1959 | Moir |
| 2,908,206 | A | 10/1959 | Melanson |
| 2,938,438 | A | 5/1960 | Hamilton |
| 3,075,436 | A | 1/1963 | McRae |
| 3,361,042 | A | 1/1968 | Cutler |
| 3,732,023 | A | 5/1973 | Rank |
| 3,817,644 | A | 6/1974 | Matson |
| 3,970,404 | A | 7/1976 | Benedetti |
| 3,989,401 | A | 11/1976 | Moench |
| 4,018,540 | A | 4/1977 | Jackson |
| 4,104,736 | A | 8/1978 | Mendenhall |
| 4,124,325 | A | 11/1978 | Cutler |
| 4,127,351 | A | 11/1978 | Vural |
| 4,172,679 | A | 10/1979 | Wirtgen |
| 4,195,946 | A | 4/1980 | Swisher |
| 4,215,949 | A | 8/1980 | Gabriel |
| 4,261,230 | A | 4/1981 | Sindelar |

(Continued)

*Primary Examiner*—Raymond W Addie
(74) *Attorney, Agent, or Firm*—Tyson J. Wilde (57) ABSTRACT A pavement recycling machine is disclosed in one aspect of the invention as including a motorized vehicle to travel along a paved surface and having a direction of travel. A bank of substantially vertically oriented mill heads is connected to the motorized vehicle to break up the paved surface to create loose aggregate. These mill heads have axes of rotation that are substantially perpendicular to the paved surface. A controller is provided to control various operational parameters of the pavement recycling machine. These operational parameters may include, for example, the rotational speed and vertical height of the mill heads. A remote control device communicates with the controller to enable remote adjustment or monitoring of the operational parameters.

20 Claims, 5 Drawing Sheets

U.S. PATENT DOCUMENTS

| | | | |
|---|---|---|---|
| 4,261,669 A | 4/1981 | Edo | |
| 4,313,690 A | 2/1982 | Hojbjerg | |
| 4,335,975 A | 6/1982 | Schoelkopf | |
| 4,347,016 A | 8/1982 | Sindelar et al. | |
| 4,407,605 A | 10/1983 | Wirtgen | |
| 4,422,778 A * | 12/1983 | Shestopalov et al. | 374/135 |
| 4,473,320 A | 9/1984 | Register | |
| 4,534,674 A | 8/1985 | Cutler | |
| 4,594,022 A | 6/1986 | Jeppson | |
| 4,668,017 A | 5/1987 | Petersen | |
| 4,676,689 A | 6/1987 | Yant | |
| 4,692,350 A | 9/1987 | Clarke | |
| 4,784,518 A | 11/1988 | Cutler | |
| 4,793,730 A | 12/1988 | Butch | |
| 4,854,770 A * | 8/1989 | Puchala et al. | 404/75 |
| 4,896,995 A * | 1/1990 | Simmons | 404/90 |
| 4,968,101 A | 11/1990 | Bossow | |
| 5,026,205 A | 6/1991 | Gorski | |
| 5,131,788 A | 7/1992 | Hulicsko | |
| 5,366,320 A | 11/1994 | Hanlon | |
| 5,556,225 A | 9/1996 | Marino | |
| 5,765,926 A | 6/1998 | Knapp | |
| 5,791,814 A | 8/1998 | Wiley | |
| 5,947,636 A | 9/1999 | Mara | |
| 5,947,638 A | 9/1999 | Heims | |
| 5,951,561 A | 9/1999 | Pepper | |
| 6,122,601 A | 9/2000 | Swanson | |
| 6,158,920 A | 12/2000 | Malot | |
| 6,287,048 B1 | 9/2001 | Hollon | |
| 6,371,689 B1 | 4/2002 | Wiley | |
| 6,551,018 B2 | 4/2003 | Baker | |
| 6,577,141 B2 | 6/2003 | Gandrud | |
| 6,623,207 B2 | 9/2003 | Grubba | |
| 6,695,530 B2 * | 2/2004 | Crupi | 404/91 |
| 6,769,836 B2 | 8/2004 | Lloyd | |
| 6,799,922 B2 | 10/2004 | Smith | |
| 6,846,354 B2 * | 1/2005 | Larsen et al. | 106/122 |
| 7,144,087 B2 * | 12/2006 | Haroldsen et al. | 299/39.1 |

* cited by examiner

WIRELESS REMOTE-CONTROLLED PAVEMENT RECYCLING MACHINE

BACKGROUND OF THE INVENTION

1. Related Applications

This Patent Application is a continuation-in-part of U.S. patent application Ser. No. 11/379,643 filed on Apr. 21, 2006 and entitled Method for Depositing Pavement Rejuvenation Materials into a Layer of Aggregate. Patent application Ser. No. 11/379,643 is a Continuation-in-part of U.S. patent application Ser. No. 11/164,947 which was filed on Dec. 12, 2005 and entitled Apparatus for Depositing Pavement Rejuvenation Materials on a Road Surface. U.S. patent application Ser. No. 11/164,947 is a continuation-in-part of U.S. patent application Ser. No. 11/163,615 filed on Oct. 25, 2005 and entitled Apparatus, System, and Method for In Situ Pavement Recycling. U.S. patent application Ser. No. 11/163,615 is a continuation-in-part of U.S. patent application Ser. No. 11/070,411, U.S. Pat. No. 7,223,049, filed on Mar. 1, 2005 and entitled Apparatus, System, and Method for Directional Degradation of a Paved Surface All of the above mentioned U.S. Patent Applications are herein incorporated by reference for all that they contain.

2. Field of the Invention

The present invention relates to road reconstruction equipment and, more particularly, to wireless remote-controlled pavement recycling machines.

3. Background of the Invention

Asphalt is the most recycled material in the United States. In fact, tens of millions of tons of asphalt pavement are removed each year during highway widening and resurfacing projects and reused in paved surfaces. Such recycling efforts conserve natural resources, decrease construction time, minimize the impact of asphalt plant operations on the environment, and reduce reliance on landfills. Further, research shows that the structural performance of mixtures integrating reclaimed asphalt pavement ("RAP") is equal to, and in some instances better than, virgin asphalt pavement.

Over time, various methods for in-place recycling of asphalt pavement or concrete have evolved, including but not limited to hot in-place recycling, cold in-place recycling, and full-depth recycling. These recycling processes generally involve mechanically breaking up a paved surface, applying fresh asphalt or asphalt rejuvenation materials to the fragments, depositing the resulting mixture over a road surface, and compacting the mixture to restore a smooth paved surface. In some cases, broken asphalt may be removed from a road surface, treated off location, and then returned and compacted.

Nevertheless, current methods for performing in-place recycling have their shortcomings. For example, current pavement recycling machines often utilize a cutting drum to mechanically break up a paved surface. These cutting drums typically include numerous cutting teeth mounted to a cylindrical drum to contact and mill the pavement as the machine travels forward. Because the width of a cutting drum is fixed and the drum is normally dependent on a machine for its direction of travel, these cutting drums are typically ill-equipped to maneuver around obstacles such as underground utility lines and boxes, manholes and manhole covers, culverts, rails, curbs, gutters, and other roadway obstacles. Furthermore, pavement fragments produced by cutting drums may be too large to incorporate into a recycled paved surface.

Another shortcoming of pavement recycling machines as well as other road reconstruction equipment may be the controls used to operate such equipment. For example, a machine's controls and/or monitoring capability may be inadequate to provide a desired level of feedback and awareness of events or conditions as they occur during an in-place recycling process. Some machines may also require one or more operators to be positioned at a fixed control console or require the operators to be continuously present with the machine while it is operating.

In view of the foregoing, what is needed is an improved pavement recycling machine for performing in-place recycling. For example, it would be an improvement in the art to provide a pavement recycling machine that is better able to maneuver around various obstacles. Further needed is a pavement recycling machine better able to break up a paved surface into recyclable-sized fragments. Yet further needed is an improved control system for operating such a pavement recycling machine.

SUMMARY OF THE INVENTION

Consistent with the foregoing, and in accordance with the invention as embodied and broadly described herein, a pavement recycling machine is disclosed in one aspect of the invention as including a motorized vehicle to travel along a paved surface and having a direction of travel. A bank of substantially vertically oriented mill heads is connected to the motorized vehicle to break up the paved surface and thereby create loose aggregate. These mill heads have axes of rotation that are substantially perpendicular to the paved surface. A controller is provided to control various operational parameters of the pavement recycling machine. These operational parameters may include, for example, the rotational speed and vertical height of the mill heads. A remote control device communicates with the controller to enable remote adjustment or monitoring of the operational parameters.

In selected embodiments, the pavement recycling machine includes a translation mechanism to translate the bank relative to the motorized vehicle in a direction substantially perpendicular to the direction of travel. Similarly the operational parameters (which may be controlled or monitored by the remote control device) may include the position of the bank relative to the motorized vehicle. In other embodiments, the pavement recycling machine also includes an oscillation mechanism to oscillate the bank relative to the motorized vehicle in a direction substantially perpendicular to the direction of travel. Accordingly, the operational parameters may include the oscillation position and frequency of the oscillation mechanism.

In other embodiments, the pavement recycling machine may include multiple hollow teeth to follow the mill heads to inject a binder into the loose aggregate. Operational parameters controlled by the remote control device may include the vertical height of the teeth, the temperature of the binder, the flow rate of the binder, or the like. In certain embodiments, the teeth may inject foamed bitumen into the loose aggregate.

In selected embodiments, the pavement recycling machine may also include an application device, such as a nozzle, to apply rejuvenation materials to the loose aggregate. Accordingly, operational parameters controlled or monitored by the remote control device may include the temperature of the rejuvenation materials, the available supply of rejuvenation materials, the flow rate of the rejuvenation materials, or the like. In certain embodiments, the pavement recycling machine may also include a heater to heat the paved surface to facilitate breakup by the mill heads. In such embodiments, the remote control device may be used to control or monitor the temperature or temperature gradient of the paved surface.

In certain embodiments, the remote control device may wirelessly communicate with the controller. Accordingly, a remote control device may include a portable remote control device, a remote base station, or the like. The remote control device may also be used to control or monitor many other operational parameters, such as, for example, the position, speed, or direction of travel of the pavement recycling machine, in addition to those listed above.

In another aspect of the invention, a method for use in an in-place recycling process includes breaking up a paved surface with a bank of vertically oriented mill heads to create loose aggregate. These mill heads have axes of rotation that are substantially perpendicular to the paved surface. The method further includes wirelessly controlling various operational parameters of the mill heads, including, for example, the rotational speed and the vertical height of the mill heads.

In certain embodiments, breaking up the paved surface may include breaking up the paved surface along a selected direction of travel. Accordingly, breaking up the paved surface may include moving and/or oscillating the mill heads in a direction substantially perpendicular to the direction of travel. Wirelessly controlling may include controlling the position, oscillation position, or oscillation frequency of the mill heads in a direction substantially perpendicular to the direction of travel.

The present invention provides an improved pavement recycling machine and associated control system. The features and advantages of the present invention will become more fully apparent from the following description and appended claims, or may be learned by the practice of the invention as set forth hereinafter.

BRIEF DESCRIPTION OF THE DRAWINGS

In order to describe the manner in which the above-recited features and advantages of the present invention are obtained, a more particular description of apparatus and methods in accordance with the invention will be rendered by reference to specific embodiments thereof, which are illustrated in the appended drawings. Understanding that these drawings depict only typical embodiments of the present invention and are not, therefore, to be considered as limiting the scope of the invention, apparatus and methods in accordance with the present invention will be described and explained with additional specificity and detail through the use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of apparatus in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

In this application, "pavement" or "paved surface" refers to any artificial wear-resistant surface that facilitates vehicular, pedestrian, or other form of traffic. Pavement may include composites containing oil, tar, tarmac, macadam, tarmacadam, asphalt, asphaltum, pitch, bitumen, minerals, rocks, pebbles, gravel, sand, polyester fibers, Portland cement, petrochemical binders, concrete or the like. Likewise, rejuvenation materials refer to any of various binders, oils, and resins, including bitumen, asphalt, tar, cement, oil, pitch, or the like. Reference to aggregate refers to rock, crushed rock, gravel, sand, slag, soil, cinders, minerals, or other course materials, and may include both new aggregate and aggregate reclaimed from an existing roadway.

Figure 1:
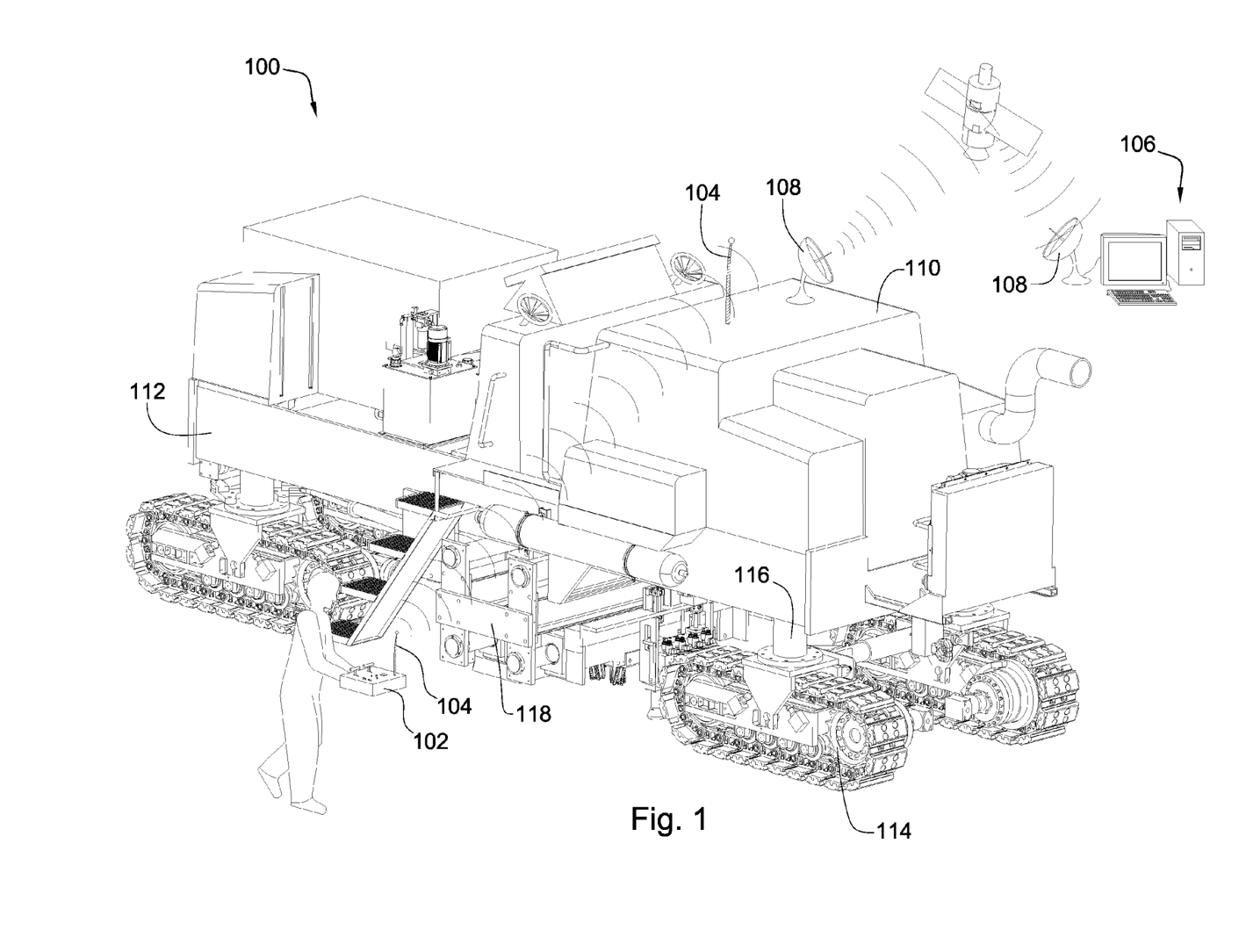
FIG. 1 is a perspective view of one embodiment of a pavement recycling machine in accordance with the invention.
Figure 2:
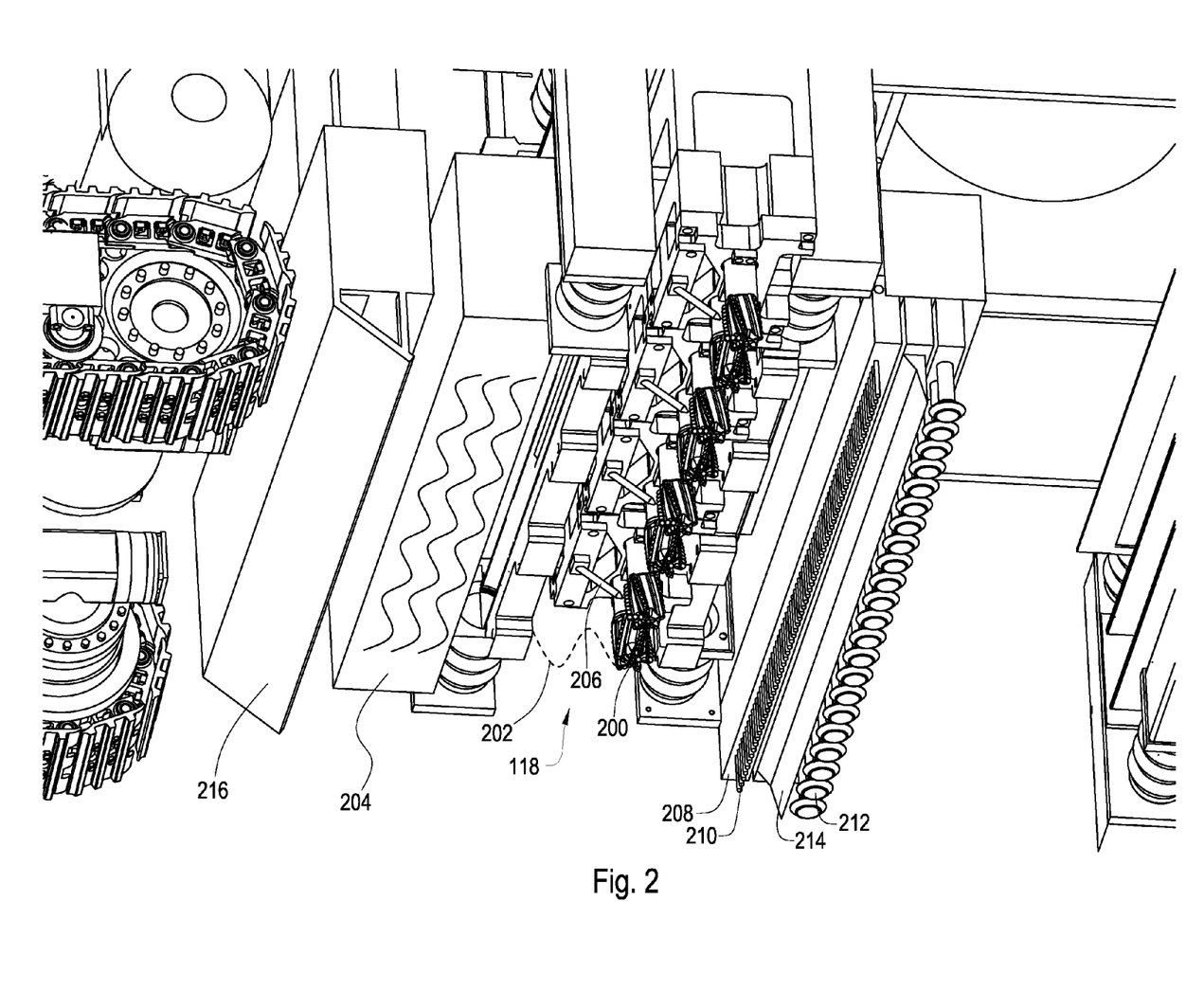
FIG. 2 is a bottom close-up perspective view of one embodiment of a pavement recycling machine in accordance with the invention.

Referring to FIGS. 1 and 2, in selected embodiments, a pavement recycling machine 100 in accordance with the invention may be used to break up and recycle a section of pavement. As previously mentioned, one shortcoming with pavement recycling machines as well as road reconstruction equipment in general may be the inadequacy or awkwardness of controls used to operate such equipment. In some cases, a machine's controls and/or monitoring equipment may fail to provide a desired level of feedback or awareness of events or conditions as they occur while recycling a paved surface. Some machines may also require an operator to be positioned in a cab or at a control console mounted to a machine, limiting the operator's ability to observe the recycling process and make necessary adjustments. This may require an operator to be continuously present during operation and may limit an operator's ability to view the operation of the machine from different angles or perspectives.

To improve the controls of a pavement recycling machine 100 and to improve the feedback and level of awareness of events or conditions as they occur, a remote control device 102 may be provided to enable an operator to control and monitor a pavement recycling machine 100 in accordance with the invention. Such a remote control device 102 may enable an operator to step away from the pavement recycling machine 100 to a desired angle and distance to view the operation of the machine 100, while still enabling the operator to control the machine 100 from his or her location.

For example, in certain cases an operator may find it useful to position him or herself alongside the pavement recycling machine 100 in order to observe its operation and make desired adjustments. This may enable an operator to receive feedback by looking beneath the machine 100. The improved visibility may also enable the operator to more easily and quickly maneuver around or avoid obstacles such as underground utility lines and boxes, manholes and manhole covers, culverts, rails, curbs, gutters, and the like. The improved visibility may also enable the operator to more easily and quickly detect and respond to various problems with the machine, maintenance requirements, or the like.

A remote control device 102 for use with the present invention may incorporate a wide variety of features to enable efficient control and monitoring of the pavement recycling machine 100. For example, the remote control device 102 may include a variety of joysticks, buttons, switches, knobs, or the like to control various operational parameters of the machine 100 as well as a variety of displays, gauges, lights, sounds, or the like to monitor various aspects of the paving machine 100. For example, the remote control device 102 may provide warning signals, sensor readings, or display real-time video gathered by cameras located at various positions on the machine 100. In certain embodiments, the remote control device 102 and the pavement recycling machine 100 may include antennas 104 to communicate wirelessly. This may enable an operator to position him or herself at various angles and distances from the pavement recycling machine 100 without being tethered by cords or wires.

In certain embodiments, a remote control device 102 may also or alternatively include a base station 106 located remotely from the pavement recycling machine 100. Like a handheld or portable remote control device 102, the base station 106 may include one or more devices such as computers, displays, I/O devices, etc. for controlling and monitoring the pavement recycling machine 100. In some cases, this ability to monitor and control may be implemented by computer hardware, software, or a combination thereof. Like a portable remote control device 102, the remote base station 106 may communicate wirelessly with the pavement recycling machine 100 through the use of antennas 108. Where direct communication is not possible, the base station 106 and pavement recycling machine 100 may utilize a communication network such as a satellite or tower-based network. In certain embodiments, a base station 106 may be used to control and monitor multiple pavement recycling machines 100 operating at different locations, reducing the need for an operator to be present at each machine 100.

A pavement recycling machine 100 may include a motorized vehicle equipped to break up and recycle a section of pavement. In certain embodiments, a pavement recycling machine 100 may include a shroud 110, covering various internal components of the pavement recycling machine 100, a frame 112, and a translation mechanism 114 such as tracks, wheels, or the like, to translate or move the machine 100. The pavement recycling machine 100 may also include a mechanism 116 for adjusting the elevation and slope of the frame 112 relative to the translation mechanism 114 to adjust for varying elevations, slopes, patterns, or contours of the underlying pavement.

In certain embodiments, the pavement recycling machine 100 may include one or more slidable carriages 118 mounted to an underside of the pavement recycling machine 100. These slidable carriages 118 may be designed to extend relative to a side of the machine 100. In some embodiments, the carriages 118 may be as wide as the machine 100. Thus, a machine equipped with two carriages 118 may sweep over an area approximately twice the width of the machine 100 when the carriages 118 are extended from each side. In addition to extending from each side of the machine 100, the carriages 118 may also oscillate from side to side in a direction perpendicular to the machine's direction of travel. This may cause the mill heads 200 to follow a substantially zigzag or wavelike path 202 as they travel through and break up the pavement.

Under the shroud 110, the pavement recycling machine 100 may include an engine and hydraulic pumps for powering the translation mechanisms 114, carriages 118, or other components. Likewise, the pavement recycling machine 100 may include tanks for storing hydraulic fluid, fuel, rejuvenation materials such as asphalt, bitumen, oil, tar, or the like, water, and aggregate such as gravel, rock, sand, grit, pebbles, macadam, concrete, or the like. The machine 100 may also include a heating element 204 for heating the paved surface prior to breakup with the mill heads 200 and an outlet 216 for supplying fresh aggregate to the paved surface.

To extend and retract the carriages 118 from each side of the pavement recycling machine 100 as well as to provide the oscillating motion, actuators, such as hydraulic cylinders, pneumatic cylinders, or the like may be used to move the carriages 118. Banks of rotary mill heads 200 may be connected to the carriages 118 to break up the paved surface. These mill heads 200 may rotate about an axis substantially perpendicular to the paved surface. Each of the rotary mill heads 200 may break apart the paved surface as they travel in a direction substantially normal to their axes of rotation. In selected embodiments, the mill heads 200 may include diamond, PCD, or cubic boron nitride inserts or inserts made of other ultra-hard materials to aid in breaking apart the pavement. At least heads are adapted for independent movement relative to each other.

In selected embodiments, one or more application devices 206 may be coupled to the carriages 118 to apply rejuvenation materials to the paved surface. For example, one or more nozzles 206 may be provided near the mill heads 200 to finely spray or coat the pavement fragments generated by the mill heads 200. In certain embodiments, the rejuvenation materials may be applied in the form of a fine mist or fog which may be mixed with the new and/or reclaimed aggregate on the road surface.

In certain embodiments, each carriage 118 may also include a rake 208 to level, smooth, and mix the new and/or reclaimed aggregate and the rejuvenation materials. In certain embodiments, the rake 208 may include a housing with multiple teeth 210 extending therefrom. In selected embodiments, each of the teeth 210 may be independently extended and retracted relative to the housing. This feature may allow selected teeth 210 to be selectively raised or lowered to avoid obstacles such as manholes, grates, railroad tracks, or other obstacles in the roadway. In certain embodiments, each of the teeth 210 may be hollow to accommodate a flow of a binder to adhere the loose aggregate. For example, the teeth 210 may discharge foamed bitumen for dispersal through the loose aggregate.

The resulting mixture may then be smoothed and compacted to form a recycled paved surface. In selected embodiments, the rake 210 may move side-to-side, front-to-back, in a circular pattern, vibrate, or the like to aid in mixing the aggregate, binders, and rejuvenation materials. Furthermore, each carriage 118 may also include a screed 214 to smooth the mixture and a bank of one or more compacting elements 212, such as tampers 212, to compact the mixture. Like the teeth 210, the tampers 212 may, in certain embodiments, be independently extendable and retractable relative to the road's surface.

Figure 3:
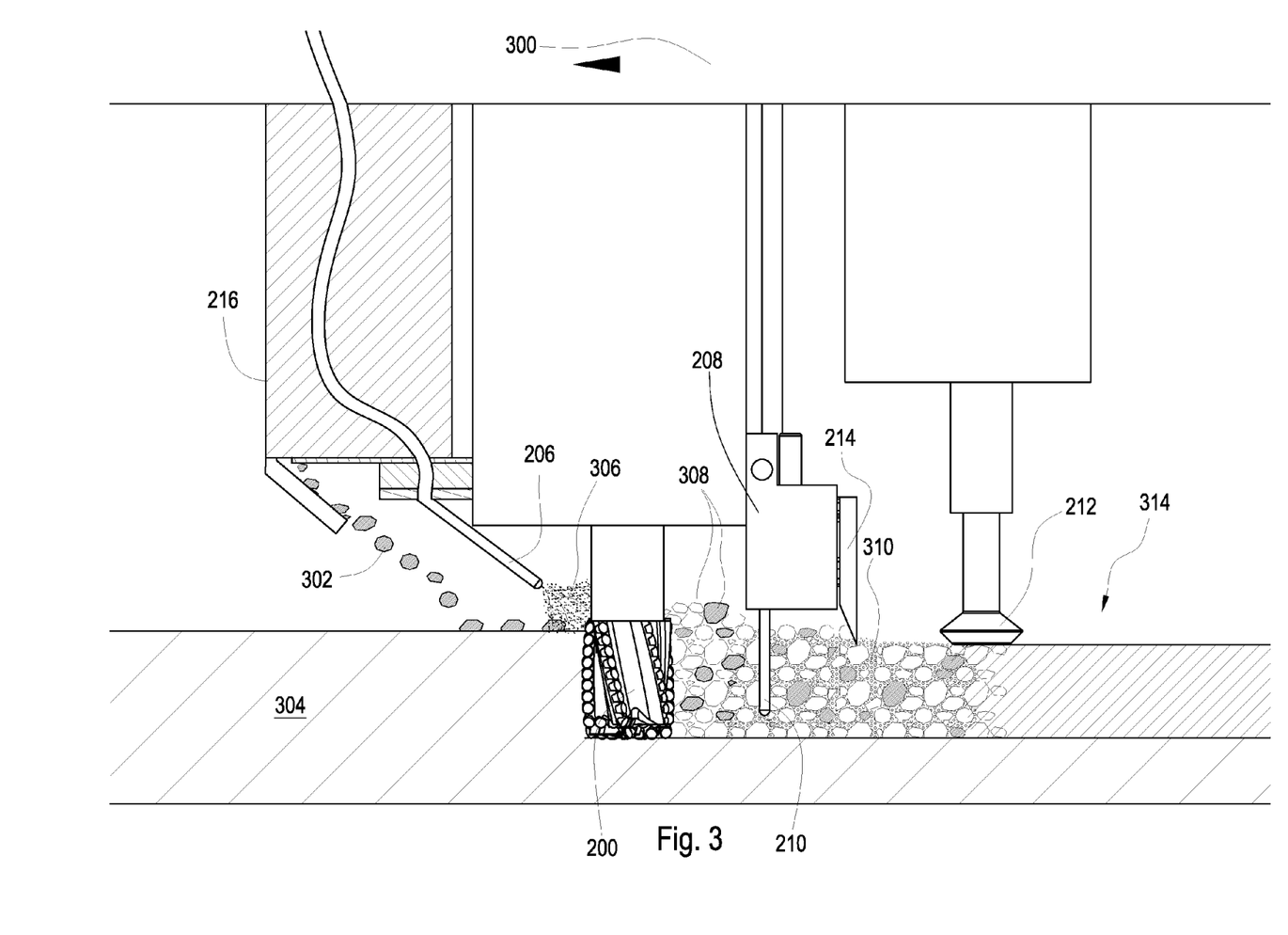
FIG. 3 is a close-up side view of one embodiment of a pavement recycling machine in accordance with the invention.

Referring to FIG. 3, a pavement recycling machine 100 may progressively break up a deteriorated paved surface into loose aggregate, add rejuvenation materials and fresh aggregate to the old aggregate, add binder to the mixture, and smooth and compact the mixture to create a recycled paved surface.

As the pavement recycling machine 100 moves forward in a direction indicated by the arrow 300, new aggregate 302 may be deposited on the deteriorated paved surface 304. The new aggregate 302 may be added to compensate for crushing, deterioration or loss of old aggregate that occurs while breaking up the paved surface 304 or that occurred to the old aggregate and other pavement constituents in the paved surface 304 over time.

Rejuvenation materials 306, such as a rejuvenating fog 306, may be applied to the new and old aggregate by one or more application devices 206, such as nozzles 206, prior to, during, or after breaking up the deteriorated paved surface 304. These rejuvenation materials 306 may include, among other materials, water, gas, polymers, synthetic clay, wax, oil-based materials, surfactants, maltenes, asphaltenes, or combinations thereof. In certain embodiments, the rejuvenation materials 306 may be used to wet the aggregate 308 to enable better adhesion to materials such as binders added later, act as a dust suppressant, or restore maltene, asphaltene or asphalt content to the old aggregate that may have been lost or deteriorated over time.

As mentioned, rotary mill heads 200 may be used to break up the paved surface 304 while rotating about axes substantially normal to the paved surface 304. In certain embodiments, the mill heads 200 may break apart the deteriorated pavement 304 without pulverizing, cutting, or otherwise damaging the aggregate contained therein. The rotation of the mill heads 200 may also serve to mix the old aggregate, rejuvenation materials 306, and new aggregate 302 in situ on the road bed.

A rake 208 may follow the mill heads 200 to level, smooth, and blend the mixture of aggregate 308 and rejuvenation materials 306. As mentioned, the teeth 210 of the rake 208 may discharge a binder such as foamed bitumen 310 (which may foam upon release to atmospheric pressure) which may disperse upward through he aggregate 308 to bind it together. The resulting mixture may then be smoothed with a screed 214 or other device and compacted with tampers 212, vibratory rollers or sleds to form a level surface 314. Once compacted, the paved surface 314 may be finished, sealed, and density checked.

Figure 4:
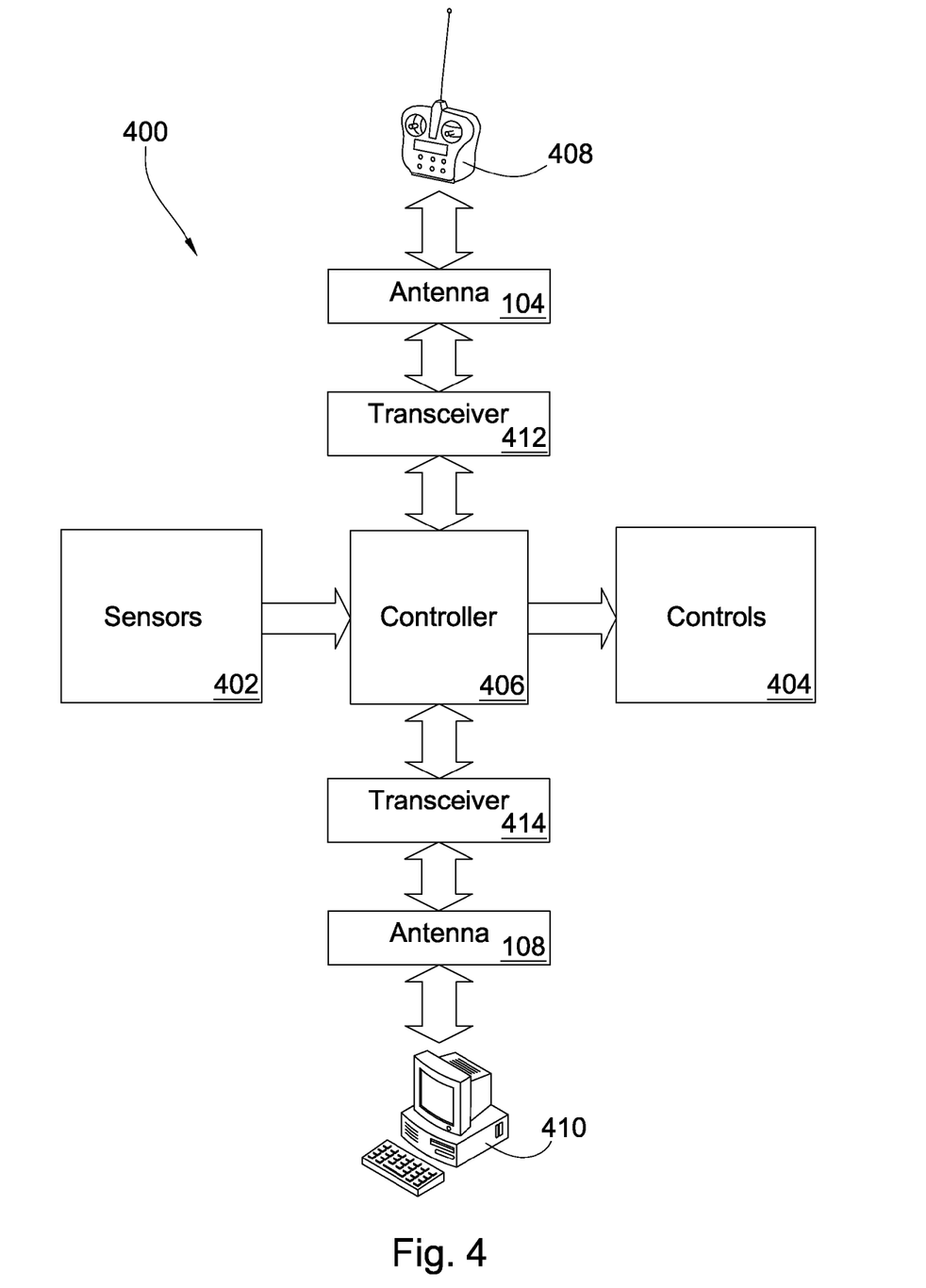
FIG. 4 is a high-level schematic block diagram of one embodiment of a control system for use with a pavement recycling machine in accordance with the invention.
Figure 5:
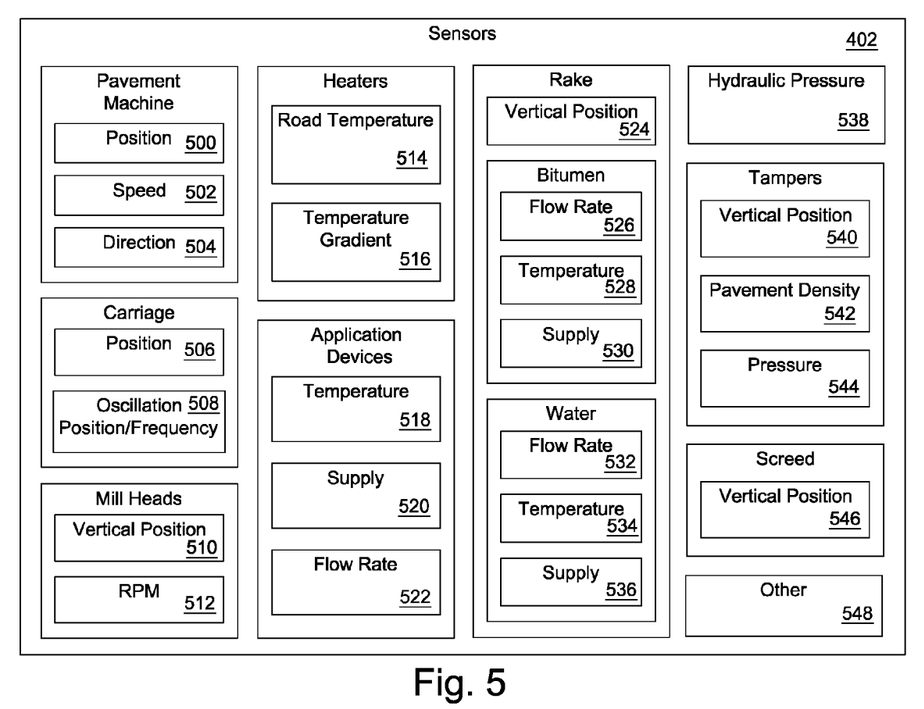
FIG. 5 is a block diagram illustrating various sensors that may be used with a control system in accordance with the invention.
Figure 6:
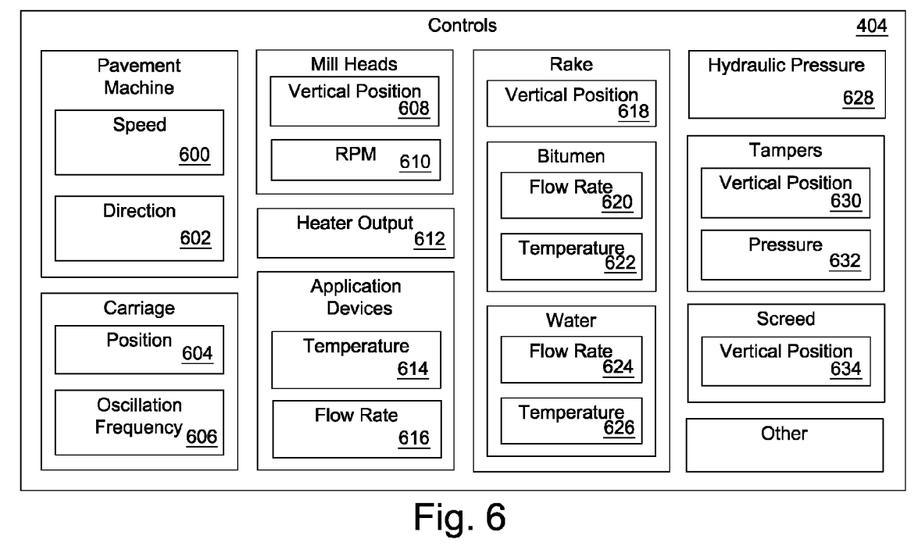
FIG. 6 is a block diagram llustrating various controls that may be used with a control system in accordance with the invention.

Referring to FIGS. 4, 5, and 6, a system 400 for controlling a pavement recycling machine 100 in accordance with the invention may include sensors 402 for sensing various operational parameters of the pavement recycling machine 100, and controls 404 for controlling the operational parameters. A controller 406 (or multiple controllers 406) may be coupled to the sensors 402 to monitor operational parameters detected by the sensors 402. Similarly, the controller 406 may be coupled to the controls 404 to adjust the operational parameters in response to feedback received from the sensors 402, as well as in response to signals received from a remote control device 408, 410, such as a portable remote control device 408, base station 410, or the like.

Various sensors 402 may be used to monitor and detect various operational parameters of the pavement recycling machine 100. One of skill in the art will recognize that sensors 402 may include a wide variety of devices used to gather information with respect to the pavement recycling machine 100, including but not limited to touch sensors, light sensors (e.g., laser sensors, phototransistors, etc.), ultrasonic sensors, infrared sensors, strain gauges, accelerometers, angle sensors, potentiometers, cameras, and the like, to name just a few. Accordingly, general reference to a sensor 402 or sensors 402 herein may encompass various types of sensors suitable for detecting operational parameters discussed in association with FIG. 5. The sensors 402 and associated operational parameters recited herein are simply examples and in no way represent an exhaustive list of every sensor 402 and associated operational parameter that may be used with a pavement recycling machine 100 in accordance with the invention In certain embodiments, sensors 402 may be used to monitor various operational parameters of the pavement recycling machine 100 as a whole, including but not limited to the position 500, speed 502, and direction 504 of the machine 100. Other sensors 402 may be used to detect the position 506 of the carriages 118 (i.e., how far extended the carriages are relative to the pavement recycling machine 100) as well as the oscillation position 508 and frequency 508 of the mill heads 200 coupled to the carriages 118. Other sensors 402 may be used to detect the vertical position 510 and rotational velocity 512 of the mill heads 200. Sensors 402 may also be used to detect the pavement temperature 514 and temperature gradient 516 (e.g., vertical temperature gradient) to aid in adjusting the output of heaters 204 of the pavement recycling machine 100.

In certain embodiments, sensors 402 may be used to detect operational parameters related to the application devices 206 for applying rejuvenation materials. For example, sensors 402 may be used to measure the temperature 518 of the rejuvenation materials, the supply 520 of rejuvenation materials, the flow rate 522 of rejuvenation materials, pressure of the rejuvenation materials, or the like. Similarly, other sensors 402 may be used to take measurements with respect to the rake 208. This may include measuring the vertical position 524 of the rake 208 as a whole or the vertical position of each tooth or groups of teeth of the rake 208. Where the teeth discharge a binder such as foamed bitumen, this may include measuring the temperature 528, supply 530, flow rate 526, or pressure of the bitumen as well as the temperature 534, supply 536, flow rate 532, or pressure of the water mixed with the bitumen to generate foamed bitumen.

Other sensors 402 may be used to measure the pressure 538 of hydraulic fluid used to power various devices (e.g., mill heads, carriages, tracks, etc.) of the pavement recycling machine 100. Yet other sensors 402 may be used to measure the vertical position 540 or pressure 544 of tampers 212, the pavement density 542, the screed position 546, as well as various other operational parameters 548 of the pavement recycling machine 100.

In addition to sensors 402, one or more controls 404 may be used to adjust various operational parameters of the pavement recycling machine 100. For example, controls 404 may be used to adjust the speed 600 or direction 602 of the machine 100 by controlling the translation mechanism or steering of the machine 100. Similarly, other controls 404 may be used to control the position 604, oscillation position or oscillation frequency 606 of the carriage 118, as well as the vertical position 608 or rotational speed 610 of the mill heads 200. Other controls 404 may be used to adjust the output 612 of the heaters, the temperature 614 or flow rate 616 of rejuvenation materials, or hydraulic fluid pressure 628. Yet other controls 404 may be used to adjust the vertical position 618 of the rake 208 or teeth of the rake 208, the vertical position 630 or pressure 632 exerted by tampers 212, the vertical position 634 of the screed 214, as well as the temperature 622, 626 and flow rate 620, 624 of binders discharged through the rake 208. These are just a few example of various controls 404 that may be provided and do not represent an exhaustive list.

In certain embodiments, the controller 406 may automatically adjust the controls 404 based on feedback received from the sensors 402 to provide a closed-loop system. This allows any or all of the operational parameters to be corrected in real-time to achieve a selected target value or "setpoint." In other embodiments, the controls 404 may be adjusted through use of a remote control device, such as a wireless portable remote control 408 or remote base station 410. These remote control devices 408, 410 may communicate with the controller 406 by way of one or more transceivers 412, 414 and antennas 104, 108. The remote control devices 408, 410 may be used to directly alter the operational parameters or they may be used to set or alter one or more setpoints, after which the pavement recycling machine 100 may operate in a closed-loop manner.

In certain embodiments, one or more controllers 406 such as a Bosch Rexroth RC6-9 or other similar controller may be used to receive input from the sensors 402 and provide output to the controls 404. The RC6-9 is a programmable control unit that may be used to control multiple proportional solenoids as well as provide other switching functions. The RC6-9 can be used for complex open and closed-loop control when combined with pumps, motors, valves, sensors, transducers, actuators, or the like, of the pavement recycling machine 100. The RC6-9 is also equipped with CANbus interfaces to exchange data with other bus users, such as other RC6-9 controllers, or electronic systems such as remote control units, displays, joysticks, etc.

Similarly, in certain embodiments, the transceivers 412, 414 may include, for example, an Omnex R170 CANbus receiver which may be used to translate wireless signals to CANbus messages for interfacing with the RC6-9 control unit. The transceivers 412, 414 may also include, for example, a CANview WLAN to convert CANbus messages to 802.11b messages for transmission over a LAN/WLAN. This enables data from the controller 406 to be converted to an 802.11b protocol for transmission over the Internet or for wireless transmission to a PC or laptop.

In certain embodiments, a remote control device 408, 410 for communicating with the transceivers 412, 414 may include, for example, an Omnex Origa T300 transmitter. The T300 is a weather-proof spread spectrum transmitter which is fabricated of high impact, low temperature plastic for operation in the field. The T300 provides eight proportional functions and up to eight additional discrete functions.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

We claim:

1. A pavement recycling machine comprising:
    a motorized vehicle to travel along a paved surface, the motorized vehicle having a direction of travel;
    a bank of vertically oriented mill heads connected to the motorized vehicle to break up the paved surface to create loose aggregate, the mill heads having axes of rotation substantially perpendicular to the paved surface;
    a controller to adjust various operational parameters of the pavement recycling machine, the operational parameters comprising at least one of the rotational speed and vertical height of the mill heads;
    a remote control device in communication with the controller to enable at least one of remote adjustment and monitoring of the operational parameters; and
    at least some of said heads are adapted for independent movement relative to each other.

2. The pavement recycling machine of claim 1, further comprising a translation mechanism to translate the bank relative to the motorized vehicle in a direction substantially perpendicular to the direction of travel.

3. The pavement recycling machine of claim 2, wherein the operational parameters further comprise the position of the bank relative to the motorized vehicle.

4. The pavement recycling machine of claim 2, farther comprising an oscillation mechanism to oscillate the bank relative to the motorized vehicle in a direction substantially perpendicular to the direction of travel.

5. The pavement recycling machine of claim 4, wherein the operational parameters farther comprise at least one of the oscillation position and frequency of the oscillation mechanism.

6. The pavement recycling machine of claim 1, farther comprising a plurality of hollow teeth to follow the mill heads and inject a binder into the loose aggregate.

7. The pavement recycling machine of claim 6, wherein the operational parameters further comprise at least one of the vertical height of the hollow teeth, the temperature of the binder, and the flow rate of the binder.

8. The pavement recycling machine of claim 6, wherein the binder comprises foamed bitumen comprising a mixture of heated bitumen and water.

9. The pavement recycling machine of claim 1, further comprising an application device to apply rejuvenation materials to the loose aggregate.

10. The pavement recycling machine of claim 9, wherein the operational parameters farther comprise at least one of the temperature of the rejuvenation materials, the available supply of rejuvenation materials, and the flow rate of the rejuvenation materials.

11. The pavement recycling machine of claim 1, further comprising a heater to heat the paved surface prior to breakup with the mill heads.

12. The pavement recycling machine of claim 11, wherein the operational parameters further comprise at least one of the temperature and the temperature gradient of the paved surface.

13. The pavement recycling machine of claim 1, wherein the remote control device wirelessly communicates with the controller.

14. The pavement recycling machine of claim 1, wherein the remote control device is selected from the group consisting of a wireless portable remote control and a remote base station.

15. The pavement recycling machine of claim 1, wherein the operational parameters further comprise at least one of the position, speed, and direction of travel of the pavement recycling machine.

16. The pavement recycling machine of claim 1, wherein the controller is further configured to automatically adjust the operational parameters in response to feedback received from at least one sensor monitoring the operational parameters.

17. A method comprising:
    breaking up a paved surface with a bank of substantially vertically oriented mill heads to create loose aggregate, the mill heads having axes of rotation substantially perpendicular to the paved surface, at least some of said heads are adapted for independent movement relative to each other; and
    wirelessly controlling various operational parameters of the mill heads, the operational parameters comprising at least one of the rotational speed and the vertical height of the mill heads.

18. The method of claim 17, wherein breaking up further comprises breaking up the paved surface along a selected direction of travel.

19. The method of claim 17, wherein breaking up further comprises oscillating the mill heads in a direction substantially perpendicular to the direction of travel.

20. The method of claim 19, wherein wirelessly controlling further comprises wirelessly controlling at least one of the oscillation position and frequency of the mill heads.

* * * * *